3,753,994
1,1'-AZINOBIS(1,2,3,4-TETRAHYDROISO-QUINOLINES)

Guy D. Diana, Stephentown, N.Y., assignor to Sterling Drug Inc., New York, N.Y.
No Drawing. Filed Aug. 10, 1970, Ser. No. 62,700
Int. Cl. C07d 35/34
U.S. Cl. 260—288 R          2 Claims

ABSTRACT OF THE DISCLOSURE 1-(2-substituted-hydrazino) - 3,4 - dihydroisoquinolines, prepared in one process by alkylating the corresponding 3,4-dihydroisocarbostyrils, hydrazinolyzing the resulting 1-alkoxy-3,4-dihydroisoquinolines and condensing the resulting 1-hydrazino-3,4-dihydroisoquinolines with aldehydes or ketones, and 1,1'-azinobis(1,2,3,4-tetrahydroisoquinolines), prepared by condensing corresponding 1-alkoxy-3,4-dihydroisoquinolines and 1-hydrazino-3,4-dihydroisoquinolines, are useful as antihypertensive agents.

---

This invention relates to new and useful compositions of matter classified in the art of chemistry as isoquinolines and to processes for their preparation.

In one of its composition of matter aspects my invention provides 1-[2-(X,X'-methylene)hydrazino]-3-(Y)-4-(Y')-6-(Z)-7-(Z')-3,4-dihydroisoquinoline of the formula

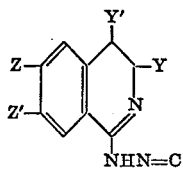

NHN=CXX'          (Formula I)

wherein X, when taken alone, is hydrogen; alkyl of one to six carbon atoms; alkenyl of two to six carbon atoms; cycloalkyl of three to seven ring atoms and three to ten carbon atoms; cycloalkenyl of five to seven ring atoms and five to ten carbon atoms; phenyl; phenylalkyl of seven to ten carbon atoms; phenylalkenyl of eight to ten carbon atoms; phenyl substituted by one to three members selected from the group consisting of halo, hydroxy, atertiary alkyl of one to four carbon atoms and atertiary alkoxy of one to four carbon atoms or by a member selected from the group consisting of atertiary alkylthio of one to four carbon atoms, dialkylamino wherein alkyl is atertiary alkyl of one to four carbon atoms, atertiary alkoxycarbonyl of two to five carbon atoms, carbamoyl, cyano, nitro and sulfamoyl;

X', when taken alone, is hydrogen or arteriary alkyl of one to four carbon atoms;

X and X', when taken together with C, are cycloalkylidene of five to seven ring atoms and five to ten carbon atoms;

Y is hydrogen or atertiary alkyl of one to four carbon atoms;

Y' is hydrogen, atertiary alkyl of one to four carbon atoms, phenyl, hydroxy or atertiary alkoxy of one to four carbon atoms;

Z and Z', when taken alone, are the same or different and are hydrogen, atertiary alkyl of one to four carbon atoms, halo, hydroxy or atertiary alkoxy of one to four carbon atoms;

Z and Z', when taken together, are methylenedioxy;

and acid addition salts thereof.

In another of its composition of matter aspects my invention provides 1,1'-azinobis[3-(Y)-4-(Y')-6-(Z)-7-(Z')-1,2,3,4-tetrahydroisoquinoline] of the formula

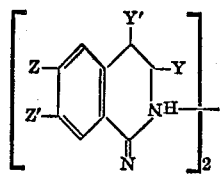

(Formula II)

wherein Y, Y', Z and Z' have the same meanings ascribed thereto above in Formula I, and acid addition salts thereof.

The isoquinolines of Formulas I and II and acid addition salts thereof have antihypertensive activity and are useful as antihypertensive agents.

In still another of its composition of matter aspects my invention provides 1-(QO)-3-(Y)-4-(Y')-6-(Z)-7-(Z')-3,4-dihydroisoquinoline of the formula

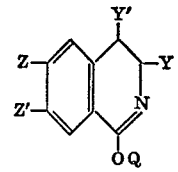

(Formula III)

wherein Q is methyl, ethyl or propyl and Y, Y', Z and Z' have the meanings ascribed thereto above in Formula I, and acid addition salts thereof.

The isoquinolines of Formula III and acid addition salts thereof are useful as intermediates in preparing the isoquinolines of Formulas I and II.

In one of its process aspects my invention provides the process for producing 1-[2-(X,X'-methylene)hydrazino]-3-(Y)-4-(Y') - 6 - (Z)-7-(Z')-3,4-dihydroisoquinoline of Formula I which comprises the steps of alkylating 3-(Y)-4-(Y')-6-(Z)-7-(Z')-3,4 - dihydroisocarbostyril of the formula

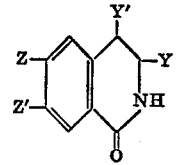

(Formula IV)

with a Q₃O⁺ salt, wherein Q is methyl, ethyl or propyl, hydrazinolyzing the resulting 1 - (QO)-3-(Y)-4-(Y')-6-(Z)-7-(Z')-3,4-dihydroisoquinoline of Formula III, and condensing the resulting 3-(Y)-4-(Y')-6-(Z)-7-(Z')-1-hydrazino-3,4-dihydroisoquinoline of the formula

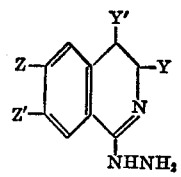

NHNH₂          (Formula V)

with an aldehyde or a ketone of the formula O=CXX'.

In another of its process aspects my invention provides the process for producing 1-[2-(X,X'-methylene)hydrazino] - 3 - (Y) - 4 - (Y') - 6 - (Z) - 7 - (Z') - 3,4 - dihydroisoquinoline of Formula I which comprises the steps of alkylating 3-(Y)-4-(Y')-6-(Z)-7-(Z')-3,4-dihydroisocarbostyril of Formula IV with a Q₃O⁺ salt, wherein Q is methyl, ethyl or propyl, ammonolyzing the resulting 1 - (QO) - 3 - (Y)-4-(Y')-6-(Z)-7-(Z')-3,4-dihydroisoquinoline of Formula III with an RR'NH₂⁺ salt, whereinin R and R', when taken alone, are the same or different and are hydrogen, atertiary alkyl of one to four carbon atoms, cycloalkyl of five to seven ring atoms and five to ten carbon atoms, or phenylalkyl of seven to ten carbon atoms, and wherein R and R' when taken together with N, are 1-pyrrolidinyl, piperidino or morpholino, hydrazinolyzing the resulting 1-(RR'N)-3-(Y)-4-(Y')-6-(Z)-7-(Z')-3,4-dihydroisoquinoline of the formula

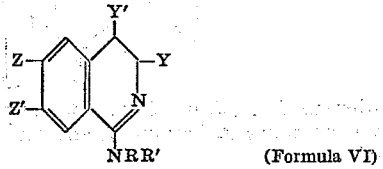

(Formula VI)

and condensing the resulting 3-(Y)-4-(Y')-6-(Z)-7-(Z')-1-hydrazino-3,4-dihydroisoquinoline of Formula V with an aldehyde or a ketone of the Formula O=CXX'.

In still another of its process aspects my invention provides the process for producing 1-[2-(X,X'-methylene)hydrazino] - 3 - (Y) - 4 - (Y') - 6-(Z)-7-(Z')-3,4-dihydroisoquinoline of Formula I which comprises the steps of cyclizing 1 - {1-(Y)-2-(Y')-2-[3-(Z)-4-(Z')-phenyl]ethyl}-3-(T$_n$-phenyl)urea, wherein T is hydrogen, halo or atertiary alkoxy of one to four carbon atoms, and
n is one to three,
of the formula

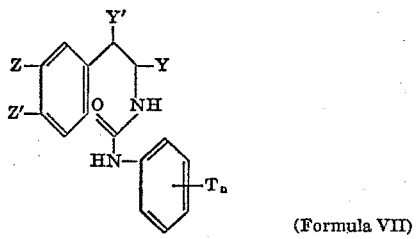

(Formula VII)

hydrazinolyzing the resulting 1 - (T$_n$ - anilino)-3-(Y)-4-(Y')-6-(Z)-7-(Z')-3,4-dihydroisoquinoline of the formula

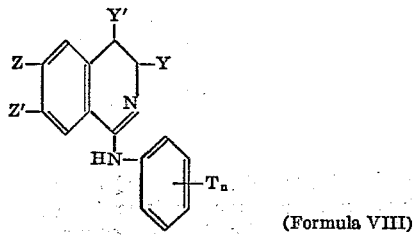

(Formula VIII)

and condensing the resulting 3-(Y)-4-(Y')-6-(Z)-7-(Z')-1-hydrazino-3,4-dihydroisoquinoline of Formula V with an aldehyde or a ketone of the formula O=CXX'.

In yet another of its process aspects my invention provides the process for producing 1,1'-azinobis[3-(Y)-4 - (Y') - 6 - (Z)-7-(Z')-1,2,3,4-tetrahydroisoquinoline] of Formula II which comprises the step of condensing 1 - (QO) - 3 - (Y) - 4 - (Y')-6-(Z)-7-(Z')-3,4-dihydroisoquinoline of Formula III with the corresponding 3-(Y)-4 - (Y') - 6-(Z)-7-(Z')-1-hydrazino-3,4-dihydroisoquinoline of Formula V.

When X of Formula I is alkyl of one to six carbon atoms, alkyl can be branched or unbranched alkyl, as illustrated by methyl, ethyl, propyl, isopropyl, butyl, isobutyl, sec-butyl, tert-butyl, pentyl and hexyl.

When X of Formula I is alkenyl of two to six carbon atoms, alkenyl can be branched or unbranched alkenyl as illustrated by vinyl, allyl, 1-methyl-1-propenyl and 2-hexenyl.

When X of Formula I is cycloalkyl of three to seven ring carbon atoms, cycloalkyl can be branched or unbranched cycloalkyl as illustrated by cyclopropyl, cyclopentyl, cyclohexyl, 4-methylcyclohexyl or cycloheptyl.

When R and/or R' of Formula VI is cycloalkyl of five to seven ring carbon atoms, cycloalkyl can be branched or unbranched cycloalkyl.

When X of Formula I is cycloalkenyl of five to seven ring carbon atoms, cycloalkenyl can be branched or unbranched cycloalkenyl as illustrated by 1-cyclopentenyl, 3-cyclohexenyl, 4-methyl-3-cyclohexenyl or 1-cycloheptenyl.

When X of Formula I and/or R and/or R' of Formula VI is phenylalkyl of seven to ten carbon atoms, phenylalkyl is, for example, benzyl, 1-phenylethyl, 3-phenylpropyl or 1-methyl-1-phenylethyl.

When X of Formula I is phenylalkenyl of eight to ten carbon atoms, phenylalkenyl is, for example, styryl, α-methylstyryl or β-methylstyryl.

When X of Formula I is phenyl substituted by halo, when Z and/or Z' of Formulas I–VIII and when T of Formula VII are halo, halo can be fluoro, chloro, bromo or iodo.

When X of Formula I is phenyl substituted by atertiary alkyl of one to four carbon atoms and when X' of Formula I, Y, Y', Z and/or Z' of Formulas I–VIII and R and/or R' of Formula VI are atertiary alkyl of one to four carbon atoms, atertiary alkyl is methyl, ethyl, propyl, isopropyl, butyl, isobutyl or sec-butyl.

When X of Formula I is phenyl substituted by atertiary alkoxy of one to four carbon atoms, when Y', Z and/or Z' of Formulas I–VIII and/or T of Formula VII are atertiary alkoxy of one to four carbon atoms, atertiary alkoxy is methoxy, ethoxy, propoxy, isopropoxy, butoxy, isobutoxy or sec-butoxy.

When X of Formula I is phenyl substituted by atertiary alkylthio of one to four carbon atoms, atertiary alkylthio is methylthio, ethylthio, propylthio, isopropylthio, butylthio, isobutylthio and sec-butylthio.

When X of Formula I is phenyl substituted by dialkylamino, wherein alkyl is atertiary alkyl of one to four carbon atoms, atertiary alkyl is methyl, ethyl, propyl, isopropyl, butyl, isobutyl and sec-butyl.

When X of Formula I is phenyl substituted by atertiary alkoxycarbonyl of two to five carbon atoms, atertiary alkoxycarbonyl is methoxycarbonyl, ethoxycarbonyl, propoxycarbonyl, isopropoxycarbonyl, butoxycarbonyl, isobutoxycarbonyl or sec-butoxycarbonyl.

When X and X', taken together with C, are cycloalkylidene of five to seven ring carbon atoms, cycloalkylidene can be branched or unbranched cycloalkylidene as illustrated by cyclopentylidine, cyclohexylidine, 4-methylcycloalkylidene or cycloheptylidene.

The manner and process of making and using the invention and the best mode of carrying it out will now be described so as to enable any person skilled in the art to which it pertains to make and use it.

Alkylation of 3-(Y)-4-(Y')-6-(Z)-7-(Z')-3,4-dihydroisocarbostyril of Formula IV is accomplished using a $Q_3O^+$ (trialkyloxonium)salt in a dry solvent inert under the reaction conditions at a temperature in the range of $-10°$ C. to 110° C. The preferred trialkyloxonium salt is triethyloxonium fluoborate. Methylene dichloride is the preferred solvent, although other solvents, for example, benzene, chloroform, dioxane, tetrahydrofuran, N,N-dimethylformamide or mixtures thereof can also be used.

Hydrazinolysis of 1-(QO)-, 1-(RR'N)- and 1-(T$_n$-anilino)-3-(Y)-4-(Y')-6-(Z)-7-(Z') - 3,4 - dihydroisoquinoline of Formulas III, VI and VIII, respectively, is carried out using hydrazine or an acid addition salt thereof in a solvent inert under the reaction conditions at a temperature in the range of 0–100° C. Ethanol is the preferred solvent, although other solvents, for example, methanol, 2-propanol, acetonitrile, dimethylsulfoxide, N,N-dimethylformamide or mixtures thereof can also be used. Hydrazinolyzing 1-(QO)-3-(Y)-4-(Y')-6-(Z)-7-(Z') - 3,4 - dihydroisoquinoline of Formula III with hydrazine also produces 1,1'-azinobis[3-(Y)-4-(Y')-6-(Z)-7-(Z') - 1,2,3,4-tetrahydroisoquinoline] of Formula II, formation of which is diminished by using an acid addition salt of hydrazine, for example, hydrazine monohydrachloride.

Condensation of 3-(Y)4-(Y')-6-(Z)-7-(Z') - 1 - hydrazino-3,4-dihydroisoquinoline of Formula V with an aldehyde or a ketone of the formula O=CXX' is achieved with or without a diluent at a temperature in the range of 0–120° C. If a diluent is used, it can be any solvent inert under the reaction conditions, for example, methanol, ethanol, ether, benzene, tetrahydrofuran or mixtures thereof.

Ammonolysis of 1 - (QO)-3-(Y)-4-(Y')-6-(Z)-7-(Z')-3,4-dihydroisoquinoline of Formula III is performed using an $RR'NH_2^+$ (ammonium) salt in a solvent inert under the reaction conditions at a temperature in the range of 0–120° C. The preferred ammonium salt is ammonium chloride and the preferred solvent is methanol. Other solvents which can be used are, for example, ethanol, 1-propanol, 2-propanol, acetonitrile, dimethylsulfoxide, N,N-dimethylformamide or mixtures thereof.

Cyclization of 1 - {1-(Y)-2-(Y')-[3-(Z)-4-(Z')-phenyl]-ethyl} - 3 - ($T_n$-phenyl)urea of Formula VII is done using a mixture of phosphorus oxychloride and phosphorus pentoxide with or without a diluent at a temperature in the range of 50–150° C. The preferred conditions are an approximately 3:1 phosphorus oxychloridephosphorus pentoxide mixture without a diluent at the reflux temperature of the mixture. If a diluent is used, it can be any solvent inert under the reaction conditions, for example, benzene or chlorobenzene.

Condensation of 1-(QO)-3-(Y)-4-(Y')-6-(Z)-7-(Z')-3,4-dihydroisoquinoline of Formula III with 3 - (Y) - 4-(Y')-6-(Z)-7-(Z')-1-hydrazino - 3,4 - dihydroisoquinoline of Formula V is effected using a solvent inert under the reaction conditions at a temperature in the range of 0–100° C. Methanol is the preferred solvent, although other solvents, for example, ethanol, 1-propanol, 2-propanol, acetonitrile, dimethylsulfoxide, N,N-dimethylformamide or mixtures thereof can also be used.

Acid addition salts of the isoquinolines of Formulas I and II of my invention can be prepared with any pharmaceutically acceptable inorganic (mineral) or organic acid. If inorganic, the acid can be, for example, hydrochloric acid, hydrobromic acid, nitric acid, phosphoric acid, sulfuric acid or sulfamic acid. If organic, the acid can be, for example, acetic acid, glycolic acid, lactic acid, quinic acid, hydrocinnamic acid, succinic acid, tartaric acid, citric acid, methanesulfonic acid or benzenesulfonic acid.

For the pharmaceutical purposes of this invention the free base forms of the isoquinolines of Formulas I and II and their corresponding acid addition salts are considered to be equivalent. That the protonic acid be pharmaceutically acceptable means that the beneficial properties inherent in the free base not be vitiated by side effects ascribable to the anions.

Although pharmaceutically acceptable salts are preferred, all acid addition salts are within the scope of the invention. A pharmaceutically unacceptable salt may be useful, for example, for purposes of identification or purification or in preparing a pharmaceutically acceptable salt by ion exchange procedures.

When crystalline, the isoquinolines of Formulas I–VIII and their acid addition salts are purified by recrystallization and are characterized by their melting points (M.P.). When liquid, the isoquinolines of Formulas I–VIII are purified by distillation under reduced pressure and are characterized by their boiling points (B.P./mm. Hg). The structures of the isoquinolines of Formulas I–III follow from the route of synthesis and are corroborated by infrared spectral analysis, by nuclear magnetic resonance spectral analysis and by the correspondence of calculated and found values of elemental analysis of representative samples.

As stated above the isoquinolines of Formulas I and II of the invention have antihypertensive activity and are useful as antihypertensive agents. The antihypertensive activity was determined in unanesthetized renal hypertensive rats using the photo-electric tensometer foot method described by Kersten, Brosene, Ablondi and SubbaRow, Journal of Laboratory and Clinical Medicine 32, 1090 (1947). In this test the compound to be tested is administered orally, preferably in the form of a pharmaceutically acceptable acid addition salt, as a solution or suspension in distilled water, by stomach tube with the aid of 1% gum tragacanth or subcutaneously to groups of three renal hypertensive rats at each of four different dose levels graduated at 0.3 to 0.9 logarithmic intervals. The systolic blood pressure is determined for each of the three rats at each dose level before medication and at intervals of 1, 2, 4, 5, 24 and 48 hours after medication. The unmedicated rats are considered hypertensive if the systolic blood pressure is 160 millimeters of mercury or greater. The medicated rats are considered normotensive if the systolic blood pressure is 130 millimeters of mercury or less. Each blood pressure reading is judged by these criteria. The dose level of test compound which reduces the systolic blood pressure to a normotensive level in 50% of the animals is defined as the $AED_{50}$ (approximate effective dose) value. When tested in this way, the isoquinolines of Formulas I and II of the invention were found to have $AED_{50}$ values in the range of 5–50 milligrams per kilogram.

The preparation of the intermediates of Formulas IV and VII will now be described. In Formulas IV–VIII above and in Formulas IX–XIII which follow, Y, Y', Z and Z' have the meanings ascribed thereto above in Formula I.

Those 3-(Y)-4-(Y')-6-(Z) - 7 - (Z') - 3,4 - dihydroisocarbostyrils of Formula IV which are not described in the chemical literature can be prepared, for example, by polyphosphoric acid cyclization of the corresponding methyl or ethyl N-{1-(Y)-2-(Y')-2-[3-(Z)-4-(Z')-phenyl]ethyl} carbamates of the formula

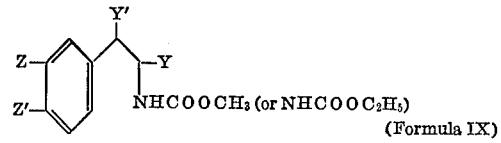

(Formula IX)

which, in turn, can be prepared from methyl or ethyl chloroformate and the corresponding 1-(Y)-2-(Y')-2-[3-(Z)-4-(Z')-phenyl]ethylamines of the formula

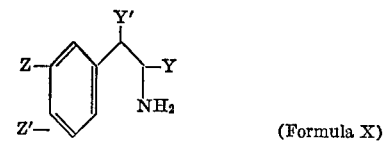

(Formula X)

Some of the 1-(Y)-2-(Y')-2-[3-(Z) - 4 - (Z')-phenyl] ethylamines of Formula X are commercially available. Those which are not commercially available and are not described in the chemical literature can be prepared, for example, by catalytic hydrogenation of the corresponding 1-(Y)-2-(Y')-2-[3-(Z)-4-(Z')-phenyl] - 1 - nitroethanes of the formula

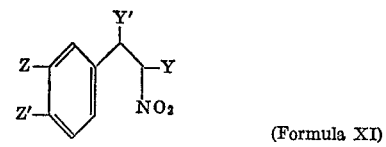

(Formula XI)

or the corresponding 1-(Y)-2-(Y')-2-[3-(Z) - 4 - (Z')-phenyl]-1-nitroethylenes of the formula

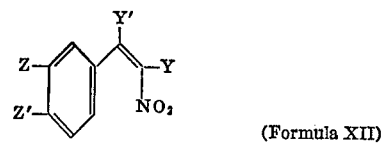

(Formula XII)

Formula XI particularly refers to those 1-(Y)-2-(Y')-2-[3-(Z)-4-(Z')-phenyl] - 1 - nitroethanes wherein Y' is a tertiary alkoxy of one to four carbon atoms, which can be prepared from the 1-(Y)-2-(Y')-2-[3-(Z) - 4 - (Z')-phenyl]-1-nitroethylenes of Formula XII wherein Y' is hydrogen, by treatment with the appropriate metal alkoxide, for example, sodium methoxide.

Those 1 - (Y)-2-(Y')-2-[3-(Z)-4-(Z')-phenyl]-1-nitroethylenes of Formula XII which are not described in the chemical literature can be prepared, for example, by condensing under base catalysis the corresponding (Y)-nitromethane and the corresponding 3-(Z)-4-(Z')-benzaldehyde or 3-(Z)-4-(Z')-phenyl-(Y')-ketone of the formula

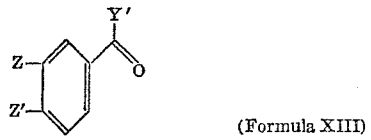

(Formula XIII)

Those 1-{1-(Y)-2-(Y')-2-[3-(Z)-4-(Z')-phenyl]ethyl}-3-($T_n$-phenyl)ureas of Formula VII which are not described in the chemical literature are prepared by condensing the corresponding 1-(Y)-2-(Y')-2-[3-(Z)-4-(Z')-phenyl]ethylamines of Formula X with the corresponding $T_n$-phenylisocyanates of the formula

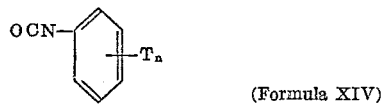

(Formula XIV)

Those $T_n$-phenylisocyanates which are not described in the chemical literature can be prepared, for example, by passing carbonyl chloride into hot solutions of the corresponding anilines in toluene, saturated with hydrogen chloride.

The following examples illustrate specific embodiments of my invention without limiting the latter thereto.

EXAMPLE 1

(A) A solution of 3,4 - dihydroisocarbostyril (IV: Y=Y'=Z=Z'=H) (64.3 g.) in dried methylene dichloride was added to a methylene dichloride (250 ml.) solution of triethyloxonium fluoborate, prepared from boron trifluoride etherate (227 g.), epichlorohydrin (74 g.) and absolute ether (600 ml.). After being stirred (for about 16 hr. at 25° C.), the mixture was treated with potassium carbonate solution (50%, 75 ml.) and water (25 ml.), stirred (for 1½ hr.) and filtered. The solid material was washed thoroughly with methylene dichloride and dissolved in hot water. The solution was filtered and extracted three times with chloroform. 1-ethoxy-3,4-dihydroisoquinoline fluoborate (10.5 g.) obtained in an earlier run was dissolved in potassium carbonate solution and the solution was extracted three times with methylene dichloride. The combined methylene dichloride washing, chloroform extract and methylene dichloride extract were stripped of solvents and distilled under reduced pressure, affording 1-ethoxy-3,4-dihydroisoquinoline (III: Q=$C_2H_5$, Y=Y'=Z=Z'=H) (68.4 g., B.P. 110–137° C./16 mm. Hg), part (10.82 g.) of which was a center cut (B.P. 129–131° C./16 mm. Hg).

(B) A solution of 1-ethoxy - 3,4 - dihydroisoquinoline (2.0 g.) in ethanol (10 ml.) was added dropwise with stirring to a solution (at 80° C.) of hydrazine (95%, 1.83 g.) in ethanol (5 ml.). The solution was concentrated, diluted with chloroform, washed with water, dried and concentrated. The residue (1.6 g.) was crystallized from ether in three crops (0.7 g., 0.5 g., 0.3 g.). Recrystallization of the first crop from ether-pentane afforded 1-hydrazino - 3,4 - dihydroisoquinoline (V: Y=Y'=Z=Z') (M.P. 55–57° C.).

A mixture of 1-amino - 3,4 - dihydroisoquinoline (VI: R=R'=Y=Y'=Z=Z'=H) hydrochloride (M.P. 133–134° C., 0.5 g.), prepared from 1-ethoxy-3,4-dihydroisoquinoline and ammonium chloride, sodium carbonate (0.38 g.), hydrazine (0.41 g.) and ethanol (15 ml.) was stirred (at 25° C.). The mixture was filtered. An ether solution of the crystals which separated from the filtrate on chilling was washed with water, dried and filtered. Concentration of the filtrate and crystallization of the residue from ether afforded 1-hydrazino-3,4-dihydroisoquinoline (0.44 g.).

Hydrazinolysis of 1-(p-methoxyanilino)-3,4-dihydroisoquinoline (VIII: T=$OCH_3$-p, n=1, Y=Y'=Z=Z'=H) (M.P. 105–106.5° C.) afforded 1-hydrazino-3,4-dihydroisoquinoline.

A mixture of 1-ethoxy-3,4-dihydroisoquinoline (1.0 g.), hydrazine monohydrochloride (0.4 g.) and absolute ethanol (15 ml.) was heated under reflux (for 40 min.). The solution was cooled, filtered and concentrated and the residue was recrystallized from ethanol-ether, affording 1-hydrazino - 3,4 - dihydroisoquinoline hydrochloride (0.9 g., M.P. 205–207° C.).

(C) A mixture of 1-hydrazino-3,4-dihydroisoquinoline (8.0 g.), acetaldehyde (20 ml.) and ethanol (20 ml.) was allowed to stand at room temperature (for 45 min.). Ethanolic sulfuric acid was added until the solution was distinctly acidic. Ether was added. The resulting oil crystallized and the crystals were recrystallized from ethanol-ether, affording 1 - (2-ethylidenehydrazino)-3,4-dihydroisoquinoline (I: X=$CH_3$, X'=Y=Y'=Z=Z'=H) sulfate in two crops (8.3 g., M.P. 152–154° C.; 0.5 g., M.P. 152–155° C.).

EXAMPLE 2

By substituting formaldehyde for acetaldehyde in Step C of Example 1, 1-(2-methylenehydrazino)-3,4-dihydroisoquinoline (I: X=X'=Y=Y'=Z=Z'=H) sulfate is obtained.

EXAMPLE 3

By substituting isobutyraldehyde for acetaldehyde in Step C of Example 1, 1-(2-isobutylidenehydrazino)-3,4-dihydroisoquinoline (I: X=$(CH_3)_2CH$,

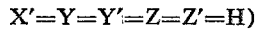

sulfate is obtained.

EXAMPLE 4

Valderaldehyde (5.14 g.) was added to a refluxing solution of 1-hydrazino-3,4-dihydroisoquinoline (8 g.) in ether (300 ml.). The mixture was allowed to stand (for 45 min.) at room temperature. Ethereal hydrochloric acid was added. Recrystallization of the resulting solid from ethanol-ether gave 1-(2-pentylidenehydrazine)-3,4-dihydroisoquinoline (I: X=$CH_3(CH_2)_3$,

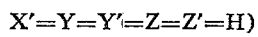

hydrochloride in two crops (11.6 g. and 0.2 g., M.P. 147–148° C.).

EXAMPLE 5

By substituting pivaldehyde for valeraldehyde in Example 4, 1-[2-(tert-butylmethylene)hydrazino] - 3,4-dihydroisoquinoline (I: X=$CH_3)_3C$,

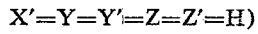

hydrochloride is obtained.

EXAMPLE 6

In a manner similar to that of Example 4, condensation of 1-hydrazino-3,4-dihydroisoquinoline (11.0 g.) and tiglaldehyde (7.47 g.) and treatment of the product with sulfuric acid gave 1-[2-(2,3-dimethylallylidene)hydrazino]-3,4-dihydroisoquinoline (I: X=$CH_3CH=C(CH_3)$,

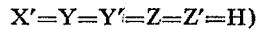

sulfate (5.1 g., M.P. 231–232° C. with decomposition).

EXAMPLE 7

By substituting cyclopentanecarboxaldehyde for valeraldehyde in Example 4, 1-[2-(cyclopentylmethylene)hydrazino]-3,4-dihydroisoquinoline (I:X=$\overline{CH_2(CH_2)_3CH}$, X'=Y=Y'=Z=Z'=H) hydrochloride is obtained.

EXAMPLE 8

By substituting 3-cyclohexenecarboxaldehyde for valeraldehyde in Example 4, 1-[2-(3-cyclohexenylmethylene)hydrazino]-3,4-dihydroisoquinoline (I:X=$\overline{CH_2CH_2CH=CHCH_2CH}$, X'=Y=Y'=Z=Z'=H) hydrochloride is obtained.

EXAMPLE 9

In a manner similar to that of Example 4, condensation of 1-hydrazino-3,4-dihydroisoquinoline (7 g.) and benzaldehyde (5.5 g.) and treatment of the reaction mixture with hydrochloric acid gave a solid, which was recrystallized from ethanol-ether, affording 1-(2-benzylidenehydrazino)-3,4-dihydroisoquinoline (I: X=$C_6H_5$,

X'=Y=Y'=Z=Z'=H)

hydrochloride (11.6 g., M.P. 226-228° C.).

EXAMPLE 10

By substituting α-phenylpropionaldehyde for valeraldehyde in Example 4, 1-[2-(2-phenylpropylidene)hydrazino]-3,4-dihydroisoquinoline (I:X=$C_6H_5(CH_3)CH$,
X'=Y=Y'=Z=Z'=H)

hydrochloride is obtained.

EXAMPLE 11

In a manner similar to that of Example 4, condensation of 1-hydrazino-3,4-dihydroisoquinoline (7.3 g.) and α-methylcinnamaldehyde (6.56 g.) and treatment of the reaction mixture with hydrochloric acid gave a solid, which was recrystallized first from ethanol-ether, then twice from N,N-dimethylformamide-ether, affording 1-[2-(2-methyl - 3 - phenylallylidene)hydrazino]-3,4-dihydroisoquinoline (I: X=$C_6H_5CH=C(CH_3)$,

X'=Y=Y'=Z=Z'=H)

hydrochloride in two crops (5.6 g. and 4.2 g., M.P. 217-219° C.).

EXAMPLE 12

By substituting p-bromobenzaldehyde for valeraldehyde in Example 4, 1-[2-(p-bromobenzylidene)hydrazino]-3,4-dihydroisoquinoline (I: X=$p-BrC_6H_4$,

X'=Y=Y'=Z=Z'=H)

hydrochloride is obtained.

EXAMPLE 13

By substituting m-hydroxybenzaldehyde for valeraldehyde in Example 4, 1-[2-(m-hydroxybenzylidene)hydrazino]-3,4-dihydroisoquinoline (I: X=-$HOC_6H_4$,

X'=Y=Y'=Z=Z'=H)

hydrochloride is obtained.

EXAMPLE 14

By substituting p-tolualdehyde for valeraldehyde in Example 4, 1-[2-(p-methylbenzylidene)hydrazino]-3,4-dihydroisoquinoline (I: X=$p-CH_3C_6H_4$,

X'=Y=Y'=Z=Z'=H)

hydrochloride is obtained.

EXAMPLE 15

In a manner similar to that of Example 4, condensation of 1-hydrazino-3,4-dihydroisoquinoline (5.7 g.) and 2,3-dimethoxybenzaldehyde (6.17 g.) and treatment of the reaction mixture with hydrochloric acid gave a solid, which was recrystallized twice from ethanol, affording 1-[2-(2,3-dimethoxybenzylidene)hydrazino] - 3,4 - dihydroisoquinoline (I: X=2.3-$(CH_3O)_2C_6H_3$,

X'=Y=Y'=Z=Z'=H)

hydrochloride (8.2 g., M.P. 222-223° C.).

EXAMPLE 16

In a manner similar to that of Example 4, condensation of 1-hydrazino-3,4-dihydroisoquinoline (10.0 g.) and syringaldehyde (12.5 g.) and treatment of the reaction mixture with hydrochloric acid gave a solid, which was recrystallized from N,N-dimethylformamide-ether, affording 1-[2-(3,5-dimethoxy - 4 - hydroxybenzylidene)hydrazino]3,4-dihydroisoquinoline (I: X=3,5-$(CH_3O)_2$-4-$HOC_6H_2$,

X'=Y=Y'=Z=Z'=H)

hydrochloride in two crops (total of 18 g., M.P. 232-233° C.).

EXAMPLE 17

By substituting p-ethythiobenzaldehyde for valeraldehyde in Example 4, 1-[2-(p-ethylthiobenzylidene)hydrazino]-3,4-dihydroisoquinoline (I: X=$pC_2H_5SC_6H_4$,

X'=Y=Y'=Z=Z'=H)

hydrochloride is obtained.

EXAMPLE 18

By substituting p-dimethylaminobenzaldehyde for valeraldehyde in Example 4, 1-[2-(p-dimethylaminobenzylidene)hydrazino]-3,4-dihydroisoquinoline (I: X=$p-(CH_3)_2NC_6H_4$, X'=Y=Y'=Z=Z'=H)

hydrochloride is obtained.

EXAMPLE 19

By substituting o-methoxycarbonylbenzaldehyde for valeraldehyde in Example 4, 1-[2-(o-methoxycarbonylbenzylidene)-hydrazino] - 3,4 - dihydroisoquinoline (I: X=o—$CH_3OCOC_6H_4$, X'=Y=Y'=Z=Z'=H) hydrochloride is obtained.

EXAMPLE 20

By substituting m-carbamoylbenzaldehyde for valeraldehyde in Example 4, 1-[2-(m-carbamoylbenzylidene)hydrazino]-3,4-dihydroisoquinoline (I:

X=m—$H_2NCOC_6H_4$,

X'=Y=Y'=Z=Z'=H) hydrochloride is obtained.

EXAMPLE 21

By substituting p-cyanobenzaldehyde for valeraldehyde in Example 4, 1-[2-(p-cyanobenzylidene)hydrazino]-3,4-dihydroisoquinoline (I: X=p—$NCC_6H_4$,

X'=Y=Y'=Z=Z'=H)

hydrochloride is obtained.

EXAMPLE 22

By substituting p-nitrobenzaldehyde for valeraldehyde in Example 4, 1-[2-(p-nitrobenzylidene)hydrazino]-3,4-dihydroisoquinoline (I: X=$p-O_2NC_6H_4$,

X'=Y=Y'=Z=Z'=H)

hydrochloride is obtained.

EXAMPLE 23

By substituting p-sulfamoylbenzaldehyde for valeraldehyde in Example 4, 1-[2-(p-sulfamoyl)hydrazino]-3,4-dihydroisoquinoline (I: X=$p-H_2NSO_2C_6H_4$,

X'=Y=Y'=Z=Z'=H)

hydrochloride is obtained.

EXAMPLE 24

A solution of 1-hydrazino-3,4-dihydroisoquinoline (15.0 g.) and acetone (50 ml.) was warmed for several minutes on the steam bath, allowed to stand at room temperature (for 20 min.), then treated with cooling with a solution of concentrated sulfuric acid (6.6 ml.) in acetone. The resulting solid was triturated with acetone and recrystallized from methanol-ether, affording 1-(2-isopropylidenehydrazino) - 3,4 - dihydroisoquinoline (I: $X=X'=CH_3$, $Y=Y'=Z=Z'=H$) sulfate (24.0 g., M.P. 187–189° C. with decomposition).

EXAMPLE 25

In a manner similar to that of Example 4, condensation of 1-hydrazino-3,4-dihydroisoquinoline (9.4 g.) and cyclohexanone (6.3 g.) and treatment of the reaction mixture with sulfuric acid gave an oil, which was crystallized, then recrystallized, from isopropyl alcohol-ether, affording 1-(2-cyclohexylidenehydrazino) - 3,4 - dihydroisoquinoline

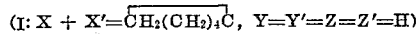
(I: $X + X'=\overline{CH_2(CH_2)_4C}$, $Y=Y'=Z=Z'=H$)

sulfate (15.3 g., M.P. 139–141° C. with decomposition).

EXAMPLE 26

(A) To a suspension of amphetamine (X: $Y=CH_3$, $Y'=Z=Z'=H$) hydrochloride (100 g.) in ether was added a solution of triethylamine (130 g.) in ether (200 ml.) followed by a solution of ethyl chloroformate (70 g.) in ether. The mixture was stirred (for ¾ hr.), then filtered. The filtrate was stripped of ether and filtered, thus providing ethyl N-(3-phenyl-2-propyl)-carbamate (IX: $Y=CH_3$, $Y'=Z=Z'=H$) as a yellow oil (117.8 g.).

(B) A mixture of ethyl N-(3-phenyl-2-propyl)carbamate (112 g.) and polyphosphoric acid (336 g.) was heated (at 155° C. for 1½ hr.), cooled, diluted with ice, extracted three times with chloroform, neutralized with sodium hydroxide solution (35%) and extracted twice more with chloroform. The combined chloroform extracts were washed with water, dried, and stripped of solvent. Recrystallization of the resulting solid (31 g.) from ether afforded 3-methyl - 3,4 - dihydroisocarbostyril (IV: $Y=CH_3$, $Y'=Z=Z'=H$) (22.5 g.).

(C) In a manner similar to that of Step A of Example 1, ethylation of 3-methyl-3,4-dihydroisocarbostyril (22.5 g.) with triethyloxonium fluoborate (0.3 mole) afforded 1-ethoxy - 3 - methyl - 3,4 - dihydroisoquinoline (III: $Q=C_2H_5$, $Y=CH_3$, $Y'=Z=Z'=H$) (20.7 g., B.P. 128–129° C./15 mm. Hg).

(D) By substituting 1-ethoxy-3-methyl-3,4-dihydroisoquinoline for 1-ethoxy-3,4-dihydroisoquinoline in Step B of Example 1, 1-hydrazino-3-methyl-3,4-dihydroisoquinoline (V: $Y=CH_3$, $Y'=Z=Z'=H$) is obtained.

(E) By substituting 1-hydrazino-3-methyl-3,4-dihydroisoquinoline for 1-hydrazino-3,4-dihydroisoquinoline in Example 24, 1-(2-isopropylidenehydrazino)-3-methyl-3,4-dihydroisoquinoline (I: $X=X'=Y=CH_3$,

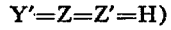
$Y'=Z=Z'=H$)

sulfate is obtained.

EXAMPLE 27

By substituting 2-phenylpropylamine (X: $Y'=CH_3$, $Y=Z=Z'=H$) hydrochloride for amphetamine hydrochloride in Step A of Example 26 and carrying the resulting ethyl N-(2-phenylpropyl)carbamate (IX: $Y'=CH_3$, $Y=Z=Z'=H$) through Steps B–E, 1-(2-isopropylidenehydrazino)-4-methyl-3,4-dihydroisoquinoline (I:

$X=X'=Y'=CH_3$,

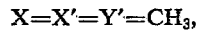
$Y=Z=Z'=H$) sulfate is obtained.

EXAMPLE 28

By substituting 3-phenyl-2-butylamine (X:

$Y=Y'=CH_3$, $Z=Z'=H$) hydrochloride for amphetamine hydrochloride in Step A of Example 26 and carrying the resulting ethyl N-(3-phenyl-2-butyl)carbamate (IX: $Y=Y'=CH_3$, $Z=Z'=H$) through Steps B–E, 1-(2-isopropylidenehydrazino)-3,4-dimethyl-3,4-dihydroisoquinoline (I:

$X=X'=Y=Y'=CH_3$, $Z=Z'=H$) sulfate is obtained.

EXAMPLE 29

By substituting 2,2-diphenylethylamine (X: $Y'=C_6H_5$, $Y=Z=Z'=H$) hydrochloride for amphetamine hydrochloride in Step A of Example 26 and carrying the resulting ethyl N-(2,2-diphenylethyl)carbamate (IX: $Y'=C_6H_5$, $Y=Z=Z'=H$) through Steps B–E, 1-(2-isopropylidenehydrazino) - 4 - phenyl-3,4-dihydroisoquinoline (I: $X=X'=CH_3$, $Y'=C_6H_5$, $Y=Z=Z'=H$) sulfate is obtained.

EXAMPLE 30

By substituting 2-hydroxy-2-phenylethylamine (X: $Y'=HO$, $Y=Z=Z'=H$) hydrochloride for amphetamine hydrochloride in Step A of Example 26 and carrying the resulting ethyl N-(2-hydroxy-2-phenylethyl)carbamate (IX: $Y'=OH$, $Y=Z=Z'=H$) through Steps B–E, 1-(2-isopropylidenehydrazino) - 4 - hydroxy-3,4-dihydroisoquinoline (I: $X=X'=CH_3$, $Y'=HO$, $Y=Z=Z'=H$) sulfate is obtained.

EXAMPLE 31

By substituting 2-methoxy-2-phenylethylamine (X: $Y'=CH_3O$, $Y=Z=Z'=H$) hydrochloride for amphetamine hydrochloride in Step A of Example 26 and carrying the resulting ethyl N-(2-methoxy-2-phenylethyl) carbamate (IX: $Y'=CH_3O$, $Y=Z=Z'=H$) through Steps B–E, 1-(2-isopropylidenehydrazino) - 4 - methoxy-3,4-dihydroisoquinoline (I: $X=X'=CH_3$, $Y=CH_3O$, $Y=Z=Z'=H$)

sulfate is obtained.

EXAMPLE 32

By substituting 2-(p-tolyl)ethylamine (X: $Z'=CH_3$, $Y=Y'=Z=H$) hydrochloride for amphetamine hydrochloride in Step A of Example 26 and carrying the resulting ethyl N - [2 - (p-tolyl)-ethyl]carbamate (IX: $Z'=CH_3$, $Y=Y'=Z=H$) through Steps B–E, 1-(2-isopropylidenehydrazino)-7-methyl-3,4-dihydroisoquinoline (I:

$X=X'=Z'=CH_3$, $Y=Y'=Z=H$) sulfate is obtained.

EXAMPLE 33

By substituting 2 - (m - chlorophenyl)ethylamine (X: $Z=Cl$, $Y=Y'=Z'=H$) hydrochloride for amphetamine hydrochloride in Step A of Example 26 and carrying the resulting ethyl N - [2-(m-chlorophenyl)ethyl]carbamate (IX: $Z=Cl$, $Y=Y'=Z'=H$) through Steps B–E 1-(2-isopropylidenehydrazino) - 6-chloro-3,4-dihydroisoquinoline (I: $X=X'=CH_3$, $Z=Cl$, $Y=Y'=Z'=H$) sulfate is obtained.

EXAMPLE 34

By substituting 2 - (m - hydroxyphenyl)ethylene (X: $Z=HO$, $Y=Y'=Z'=H$) hydrochloride for amphetamine hydrochloride in Step A of Example 26 and carrying the resulting ethyl N-[2-(m-hydroxyphenyl)ethyl]carbamate (IX: $Z=OH$, $Y=Y'=Z'=H$) through Steps B–E, 1-(2-isopropylidenehydrazino) - 6 - hydroxy - 3,4-dihydroisoquinoline (I: $X=X'=CH_3$, $Z=HO$, $Y=Y'=Z'=H$) sulfate is obtained.

EXAMPLE 35

By substituting 2-(m-methoxyphenyl)ethylamine (X: Z=CH₃O, Y=Y'=Z'=H) hydrochloride for amphetamine hydrochloride in Step A of Example 26 and carrying the resulting ethyl N-[2-(m-methoxyphenyl)ethyl]carbamate (IX: Z=CH₃O, Y=Y'=Z'=H) through Steps B–E, 1-(2 - isopropylidenehydrazino)-6-methoxy-3,4-dihydroisoquinoline (I: X=X'=CH₃, Z=CH₃O, $$Y=Y'=Z'=H)$$

sulfate is obtained.

EXAMPLE 36

(A) In a manner similar to that of Step A of Example 26, condensation of homoveratrylamine (X: Y=Y'=H, Z=Z'=CH₃O) (100 g.) and methyl chloroformate (52.2 g.) afforded methyl N - [2-(3,4-dimethoxyphenyl)ethyl]carbamate (IX: Y=Y'=H, Z=Z'=CH₃O) (90.0 g., B.P. 143–163° C./0.05–0.06 mm. Hg).

(B) In a manner similar to that of Step B of Example 26, cyclization of N-[2-(3,4-dimethoxyphenyl)ethyl]carbamate (89.0 g.) afforded 6,7-dimethoxy-3,4-dihydroisocarbostyril (IV: Y=Y'=H, Z=Z'=CH₃O) (19.6 g.) after recrystallization from toluene.

(C) In a manner similar to that of Step A of Example 1, ethylation of 6,7-dimethoxy-3,4-dihydroisocarbostyril (14.0 g.) afforded 1-ethoxy-6,7-dimethoxy-3,4-dihydroisoquinoline (III: Q=C₂H₅, Y=Y'=H, Z=Z'=CH₃O) (12.6 g.) after recrystallization from ethyl acetate.

(D) In a manner similar to that of Step B of Example 1, hyrazinolysis of 1-ethoxy-6,7-dimethoxy-3,4-dihydrosioquinoline (15.85 g.) afforded 1-hydrazino-6,7-dimethoxy-3,4-dihydroisoquinoline (V: Y=Y'=H, Z=Z'=CH₃O) (9.5 g.).

(E) In a manner similar to that of Step C of Example 1, condensation of 1-hydrazino-6,7-dimethoxy-3,4-dihydroisoquinoline (7.2 g.) with acetaldehyde (4.3 g.) and treatment of the resulting product with sulfuric acid afforded 1 - (2 - ethylidenehydrazino)-6,7-dimethoxy-3,4-dihydroisoquinoline (I: X=CH₃, X'=Y=Y'=H, Z=Z'=CH₃O) sulfate (5.4 g., M.P. 154–156° C.).

EXAMPLE 37

In a manner similar to that of Example 24, condensation of 1-hydrazine-6,7-dimethoxy-3,4-dihyroisoquinoline (7.0 g.) and acetone (100 ml.) and treatment of the reaction mixture with hydrochloric acid afforded 1-(2-isopropylidenehydrazino) - 6,7 - dimethoxy-3,4-dihydroisoquinoline (I: X=X'=CH₃, Y=Y'=H, Z=Z'=CH₃O) hydrochloride (7.55 g., M.P. 211.5–213° C. with decomposition).

EXAMPLE 38

By substituting 2 - (3,4-methylenedioxyphenyl)ethylamine (X: Y=Y'=H, Z+Z'=OCH₂O) hydrochloride for amphetamine hydrochloride in Step A of Example 26 and carrying the resulting ethyl N-[2-(3,4-methylenedioxyphenyl)ethyl]carbamate (IX: Y=Y'=H, $$Z+Z'=OCH_2O)$$

through Steps B–E, 1 - (2-isopropylidenehydrazino)-6,7-methylenedioxy-3,4-dihydroisoquinoline (I: X=X'=CH₃, Y=Y'=H, Z+Z'=OCH₂O) sulfate is obtained.

EXAMPLE 39

(A) Solution of 1-ethoxy-3,4-dihydroisoquinoline (4.25 g.) and 1-hydrazino-3,4-dihydroisoquinoline (3.9 g.) in methanol (40 ml.) was stirred at room temperature overnight and then at reflux for a day. More 1-ethoxy-3,4-dihydroisoquinoline (1 g.) was added during the reflux period. The solution was stripped of methanol and the solid was recrystallized from 2-propanol, affording 1,1'-azinobis(1,2,3,4-tetrahydroisoquinoline) (II:

$$Y=Y'=Z=Z'=H)$$

(fiirst crop, 2.6 g., M.P. 178–179° C.).

(B) 1,1'-azinobis(1,2,3,4-tetrahydroisoquinoline) was also obtained by a combination of fractional crystallization and elution chromatography of the residues from the mother liquors of crystallization of 1-hydrazino-3,4-dihydroisoquinoline obtained from a hydrazinolysis of 1-ethoxy-3,4-dihydroisoquinoline (72 g.) by the method of Step B of Example 1. The material so obtained was combined with the second crop (0.4 g.) of material from the recrystallization in Part A of this example and recrystallized from 2-propanol (1.4 g., M.P. 178–179° C.).

EXAMPLE 40

By substituting 1-ethoxy-3-methyl-3,4-dihydroisoquinoline from Step C of Example 26 for 1-ethoxy-3,4-dihydroisoquinoline and 1 - hydrazino-3-methyl-3,4-dihydroisoquinoline from Step D of Example 26 for 1-hydrazino-3,4-dihydroisoquinoline in Part A of Example 39, 1,1'-azinobis(3-methyl-1,2,3,4-tetrahydroisoquinoline) (II: Y=CH₃, Y'=Z=Z'=H) is obtained.

EXAMPLE 41

By substituting 1-ethoxy-4-methyl-3,4-dihydroisoquinoline from Step C of Example 27 for 1-ethoxy-3,4-dihydroisoquinoline and 1 - hydrazino-4-methyl-3,4-dihydroisoquinoline from Step D of Example 27 for 1-hydrazino-3,4-dihydroisoquinoline in Part A of Example 39, 1,1'-azinobis(4-methyl-1,2,3,4-tetrahydroisoquinoline) (II:

$$Y'=CH_3,$$

Y=Z=Z'=H) is obtained.

EXAMPLE 42

By substituting 1-ethoxy-3,4-dimethyl-3,4-dihydroisoquinoline from Step C of Example 28 for 1-ethoxy-3,4-dihydroisoquinoline and 1-hydrazine-3,4-dimethyl-3,4-dihydroisoquinoline from Step D of Example 28 for 1-hydrazine-3,4-dihydroisoquinoline in Part A of Example 39, 1,1' - azinobis(3,4-dimethyl-1,2,3,4-tetrahydroisoquinoline) (II: Y=Y'=CH₃, Z=Z'=H) is obtained.

EXAMPLE 43

By substituting 1-ethoxy-4-phenyl-3,4-dihydroisoquinoline from Step C of Example 29 for 1-ethoxy-3,4-dihydroisoquinoline and 1 - hydrazino-4-phenyl-3,4-dihydroisoquinoline from Step D of Example 29 for 1-hydrazino-3,4-dihydroisoquinoline in Part A of Example 29, 1,1'-azinobis(4-phenyl-1,2,3,4-tetrahydroisoquinoline) (II:

$$Y'=C_6H_5,$$

Y=Z=Z'=H) is obtained.

EXAMPLE 44

By substituting 1 - ethoxy - 4 - hydroxy-3,4-dihydroisoquinoline from Step C of Example 30 for 1-ethoxy-3,4-dihydroisoquinoline and 1-hydrazino - 4 - hydroxy-3,4-dihydroisoquinoline from Step D of Example 30 for 1-hydrazino-3,4-dihydroisoquinoline in Part A of Example 39, 1,1' - azinobis(4-hydroxy-1,2,3,4-tetrahydroisoquinoline) (II: Y'=HO, Y=Z=Z'=H) is obtained.

EXAMPLE 45

By substituting 1 - ethoxy - 4 - methoxy-3,4-dihydroisoquinoline from Step C of Example 31 for 1-ethoxy-3,4-dihydroisoquinoline and 1-hydrazino-4-methoxy-3,4-dihydroisoquinoline from Step D of Example 31 for 1-hydrazino-3,4-dihydroisoquinoline in Part A of Example 39, 1,1' - azinobis(4-methoxy-1,2,3,4-tetrahydroisoquinoline) (II: Y'=CH₃O, Y=Z=Z'=H) is obtained.

EXAMPLE 46

By substituting 1-ethoxy-7-methyl-3,4-dihydroisoquinoline from Step C of Example 32 for 1-ethoxy-3,4-dihydroisoquinoline and 1 - hydrazino - 7 - methyl-3,4-dihydroisoquinoline from Step D of Example 32 for 1-hydrazino-3,4-dihydroisoquinoline in Part A of Example 39, 1,1'- azinobis(7-methyl - 1,2,3,4 - tetrahydroisoquinoline) (II: Y=Y'=Z=H, Z'=CH₃) is obtained.

EXAMPLE 47

By substituting 1-ethoxy-6-chloro-3,4-dihydroisoquinoline from Step C of Example 33 for 1-ethoxy-3,4-dihydroisoquinoline and 1 - hydrazino-6-chloro - 3,4 - dihydroisoquinoline from Step D of Example 33 for 1-hydrazino-3,4-dihydroisoquinoline in Part A of Example 39, 1,1'-azinobis(6-chloro - 1,2,3,4 - tetrahydroisoquinoline) (II: Y=Y'=Z'=H, Z=Cl) is obtained.

EXAMPLE 48

By substituting 1 - ethoxy - 6 - hydroxy-3,4-dihydroisoquinoline from Step C of Example 34 for 1-ethoxy-3,4-dihydroisoquinoline and 1-hydrazino-6-hydroxy-3,4-dihydihydroisoquinoline and 1-hydrazino-6-methoxy-3,4-dihyzino-3,4-dihydroisoquinoline in Part A of Example 39, 1,1'-azinobis(6 - hydroxy-1,2,3,4-tetrahydroisoquinoline) (II: Y=Y'=Z'=H, Z=HO) is obtained.

EXAMPLE 49

By substituting 1 - ethoxy-6-methoxy - 3,4 - dihydroisodihydroisoquinoline and 1 - hydrazino-6,7-dimethoxy-3,4-dihydroisoquinoline and 1-hydrazine-6-methoxy-3,4-dihydroisoquinoline from Step D of Example 35 for 1-hydrazino-3,4-dihydroisoquinoline in Part A of Example 39, 1,1' - azinobis(6-methoxy-1,2,3,4-tetrahydroisoquinoline) (II: Y=Y'=Z'=H, Z=CH₃O) is obtained.

EXAMPLE 50

By substituting 1-ethoxy-6,7-dimethoxy-3,4-dihydroisoquinoline from Step C of Example 36 for 1-ethoxy-3,4-dihydroisoquinoline and 1-hydrozino-6,7-dimethoxy-3,4-dihydroisoquinoline from Step D of Example 36 for 1-hydrazino-3,4-dihydroisoquinoline in Part A of Example 39, 1,1'-azinobis(6,7-dimethoxy - 1,2,3,4 - tetrahydroisoquinoline) (II: Y=Y'=H, Z=Z'=CH₃O) is obtained.

EXAMPLE 51

By substituting 1 - ethoxy-6,7-methylenedioxy-3,4-dihydroisoquinoline from Step C of Example 38 for 1-ethoxy-3,4-dihydroisoquinoline and 1 - hydrazino-6,7-methylenedioxy-3,4-dihydroisoquinoline from Step D of Example 38 for 1-hydrazino-3,4-dihydroisoquinoline in Part A of Example 39, 1,1'-azinobis(6,7 - methylenedioxy - 1,2,3,4-tetrahydroisoquinoline) (II: Y=Y'=H, Z+Z'=OCH₂O) is obtained.

What is claimed is:
1. 1,1' - azinobis[3-(Y)-4-(Y')-6-(Z)-7-(Z') - 1,2,3,4-tetrahydroisoquinoline] of the formula

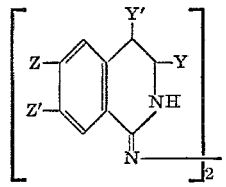

wherein Y is hydrogen or a tertiary alkyl of one to four carbon atoms;

Y' is hydrogen, a tertiary alkyl of one to four carbon atoms, phenyl, hydroxy or a tertiary alkoxy of one to four carbon atoms;

Z and Z', when taken alone, are the same or different and are hydrogen, a tertiary alkyl of one to four carbon atoms, halo, hydroxy or a tertiary alkoxy of one to four carbon atoms;

Z and Z', when taken together, are methylenedioxy;

and pharmaceutically acceptable acid addition salts thereof.

2. 1,1' - azinobis(1,2,3,4 - tetrahydroisoquinoline) according to claim 1.

References Cited
UNITED STATES PATENTS

| | | | |
|---|---|---|---|
| 3,560,620 | 2/1971 | Schor | 260—283 BI |
| 2,719,158 | 9/1955 | Druey | 260—288 R |
| 2,894,031 | 7/1959 | Rudner | 260—566 B |
| 3,644,366 | 2/1972 | Jeanmart | 260—288 R |
| 3,652,570 | 3/1972 | Gittos | 260—288 R |

FOREIGN PATENTS

| | | | |
|---|---|---|---|
| 3,589 | 11/1965 | France | 260—288 |

DONALD G. DAUS, Primary Examiner

U.S. Cl. X.R.

260—240 G, 283 S, 283 SA, 283 BI, 283 SY, 283 LN, 280 R, 287 R, 288 L, 289 R, 464, 471 R, 566 B, 644; 424—258

UNITED STATES PATENT OFFICE
CERTIFICATE OF CORRECTION

Patent No. 3,753,994     Dated August 21, 1973

Inventor(s) Guy D. Diana

It is certified that error appears in the above-identified patent and that said Letters Patent are hereby corrected as shown below:

Column 16, claim 1, lines 4, 6, 7, 10 and 11 (five occurrences) "a tertiary" should read --atertiary--.

Signed and sealed this 2nd of July 1974.

(SEAL)
Attest:

EDWARD M. FLETCHER, JR.
Attesting Officer

C. MARSHALL DANN
Commissioner of Patents